(12) United States Patent
Isono

(10) Patent No.: US 7,458,737 B2
(45) Date of Patent: Dec. 2, 2008

(54) TAKING LENS SYSTEM

(75) Inventor: Masashi Isono, Hoi-gun (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 469 days.

(21) Appl. No.: 11/363,076

(22) Filed: Feb. 27, 2006

(65) Prior Publication Data

US 2006/0198630 A1 Sep. 7, 2006

(30) Foreign Application Priority Data

Mar. 1, 2005 (JP) .............................. 2005-055414

(51) Int. Cl.
*G03B 17/00* (2006.01)
*G02B 9/12* (2006.01)

(52) U.S. Cl. .................... 396/439; 348/335; 359/791

(58) Field of Classification Search ............... 396/439; 348/335, 340; 359/716, 791
See application file for complete search history.

(56) References Cited

U.S. PATENT DOCUMENTS

| | | | |
|---|---|---|---|
| 6,476,982 B1 | 11/2002 | Kawakami | 359/791 |
| 7,110,189 B2 * | 9/2006 | Koike | 359/716 |
| 2004/0179275 A1 | 9/2004 | Takeuchi et al. | |
| 2004/0196575 A1 * | 10/2004 | Nozawa | 359/791 |
| 2005/0007481 A1 | 1/2005 | Yamaguchi et al. | 348/335 |
| 2005/0264671 A1 * | 12/2005 | Isono et al. | 348/335 |

FOREIGN PATENT DOCUMENTS

| | | |
|---|---|---|
| CN | 1576939 A | 2/2005 |
| JP | 2002-228922 A | 8/2002 |
| JP | 2004-226487 A | 8/2004 |
| JP | 2004-252312 A | 9/2004 |
| JP | 2004-309695 A | 11/2004 |

OTHER PUBLICATIONS

Chinese "The First Office Action", dated Jun. 8, 2007, for counterpart Chinese Patent Application No. 200610058842.8; Together with an English-translation thereof.

* cited by examiner

*Primary Examiner*—W. B. Perkey
(74) *Attorney, Agent, or Firm*—Sidley Austin LLP

(57) ABSTRACT

A taking lens system for forming an image on a solid-state image sensor has, from the object side thereof: an aperture stop, a first lens element having a positive optical power and convex to the object side, a second lens element having a positive optical power and convex to the image-surface side, and a third lens element having a negative optical power and concave to the image-surface side. Alternatively, a taking lens system for forming an image on a solid-state image sensor has an aperture stop, a first lens element having a positive optical power, having a meniscus shape, and convex to the object side, a second lens element having a positive optical power, and a third lens element having a negative optical power. In addition, in either case, the taking lens system fulfills prescribed conditional formulae.

8 Claims, 2 Drawing Sheets

FNO=4.00

—— d
--- g
---- c
--- SC

-0.1    0.1
SPHERICAL SINE
ABERRATION CONDITION

Y'=2.2

---- DM
—— DS

-0.1    0.1
ASTIGMATISM

Y'=2.2

-5.0    5.0
DISTORTION %

FNO=4.00

—— d
--- g
---- c
--- SC

-0.1    0.1
SPHERICAL SINE
ABERRATION CONDITION

Y'=2.2

---- DM
—— DS

-0.1    0.1
ASTIGMATISM

Y'=2.2

-5.0    5.0
DISTORTION %

TAKING LENS SYSTEM

This application is based on Japanese Patent Application No. 2005-55414 filed on Mar. 1, 2005, the contents of which are hereby incorporated by reference.

BACKGROUND OF THE INVENTION

1. Field of the Invention

The present invention relates to an taking lens system, and more particularly to a high-performance, compact taking lens system suitable for use in a digital input device (such as a digital still camera or digital video camera) that captures an image of a subject with a solid-state image sensor.

2. Description of Related Art

In recent years, as personal computers and the like become more and more popular, digital still cameras and digital video cameras (hereinafter collectively referred to as digital cameras), which permit easy entry of image data into digital devices, have been becoming more and more popular for personal use among general users. Such digital cameras are expected to become even more widespread as image data input devices in the future.

Solid-state image sensors, such as CCDs (charge-coupled devices), used in digital cameras have been made increasingly small, and accordingly further miniaturization is sought in digital cameras themselves. As a result, miniaturization is eagerly sought also in taking lens systems, which occupy the largest volumes in digital input devices. The easiest way to make an taking lens system smaller is to make a solid-state image sensor smaller. However, this involves making photosensitive elements smaller, and thus makes the solid-state image sensor more difficult to fabricate, and in addition requires higher performance in the taking lens system.

On the other hand, making an taking lens system smaller while keeping the size of a solid-state image sensor unchanged inevitably brings the exit pupil position closer to the image plane. When the exit pupil position is brought closer to the image plane, the off-axial rays exiting from the taking lens system are obliquely incident on the image plane. This makes it impossible to make the most of the light-condensing ability of the micro lenses provided in front of the solid-state image sensor, with the result that the obtained image shows extremely uneven brightness between in a central portion and in a peripheral portion thereof. This can be avoided by bringing the exit pupil position of the taking lens system farther away from the image plane, but this inevitably makes the taking lens system as a whole unduly large.

Furthermore, in recent years, in keen competition for lower prices, lower costs have been increasingly eagerly sought in taking lens systems. Moreover, in recent years, as increasingly high densities are sought in solid-state image sensors, increasingly high performance has been sought in taking lens systems. To meet such requirements, Patent Publications 1 to 4 listed below, among others, propose taking lens systems for use with a solid-state image sensor that have an aperture stop disposed in front thereof and that are composed of three, namely a positive, a positive, and a negative, lens elements.

Patent Publication 1: US-2004-179275-A1
Patent Publication 2: JP-A-2004-226487
Patent Publication 3: JP-A-2004-252312
Patent Publication 4: JP-A-2004-309695

Disadvantageously, however, the three-lens-element taking lens systems proposed in Patent Publications 1 to 4 mentioned above suffer from an improper shape of the first lens element and an improper relationship between the optical powers of the first and second lens elements. As a result, these constructions are extremely sensitive to manufacturing errors relative to the lens optical axis, and therefore tend to be difficult to manufacture with satisfactory peripheral performance.

SUMMARY OF THE INVENTION

In view of the conventionally encountered inconveniences mentioned above, it is an object of the present invention to provide a low-cost, compact taking lens system that offers satisfactory optical performance suitable for use with a solid-state image sensor.

To achieve the above object, according to one aspect of the present invention, a taking lens system for forming an image on a solid-state image sensor is provided with, from the object side thereof: an aperture stop; a first lens element having a positive optical power and convex to the object side; a second lens element having a positive optical power and convex to the image-surface side; and a third lens element having a negative optical power and concave to the image-surface side. Here, the following conditional formulae (1) and (2) are fulfilled:

$$1.3 < f1/f2 < 3 \tag{1}$$

$$-4 < (r2+r3)/(r2-r3) < -2 \tag{2}$$

where
 f1 represents a focal length of the first lens element;
 f2 represents a focal length of the second lens element;
 r2 represents a radius of curvature of an object-side surface of the first lens element; and
 r3 represents a radius of curvature of an image-side surface of the first lens element.

According to another aspect of the present invention, a taking lens system for forming an image on a solid-state image sensor is provided with, from the object side thereof: an aperture stop; a first lens element having a positive optical power, having a meniscus shape, and convex to the object side; a second lens element having a positive optical power; and a third lens element having a negative optical power. Here, the conditional formulae (1) and (2) noted above are fulfilled.

According to the present invention, in a taking lens system, the shape of the first lens element and the relationship between the optical powers of the first and second lens elements are appropriately set. This lowers the sensitivity of the taking lens system to manufacturing errors, and thus makes it easy to manufacture the taking lens system with satisfactory peripheral performance. Thus, it is possible to realize a low-cost, compact taking lens system that offers satisfactory optical performance suitable for use with a solid-state image sensor. By employing a taking lens system according to the present invention in a digital input device such as a camera-equipped cellular phone or digital camera, it is possible to make the digital input device high-performance, versatile, low-cost, and compact.

DETAILED DESCRIPTION OF PREFERRED EMBODIMENTS

Figure 1:
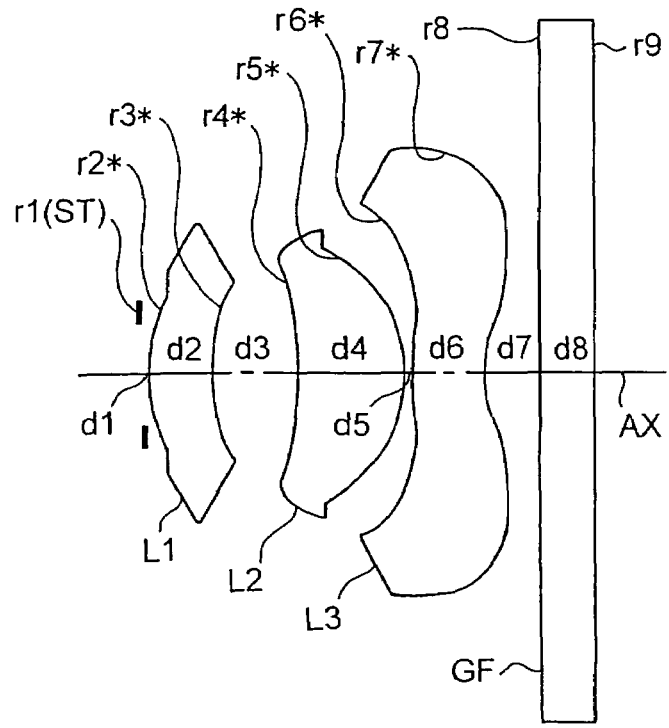
FIG. 1 is a lens construction diagram of a first embodiment (Example 1) of the present invention.
Figure 2:
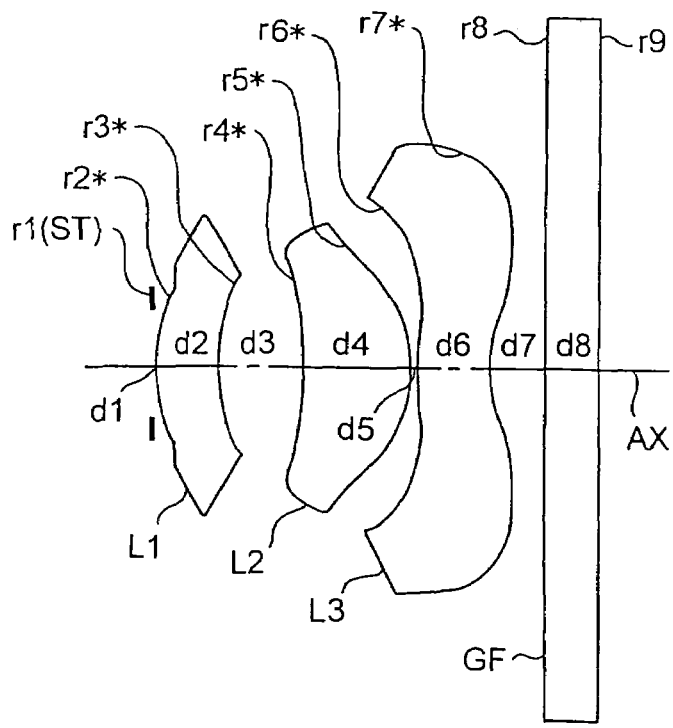
FIG. 2 is a lens construction diagram of a second embodiment (Example 2) of the present invention.
Figure 3A:
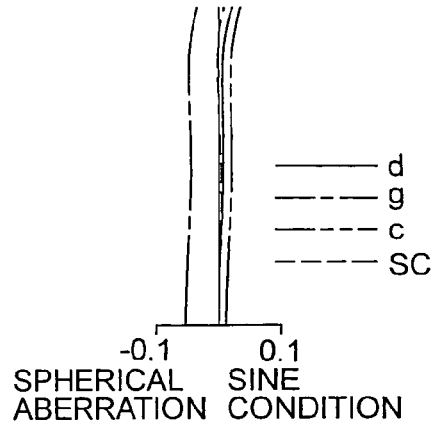
FIGS. 3A to 3C are aberration diagrams of Example 1.
Figure 3B:
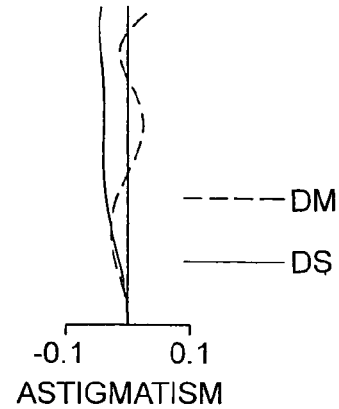
Figure 3C:
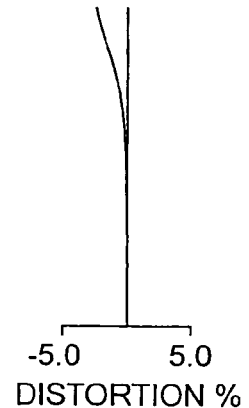
Figure 4A:
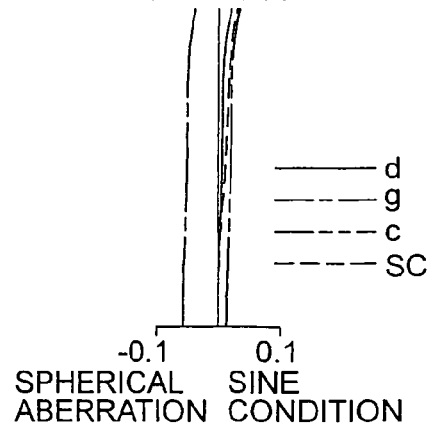
FIGS. 4A to 4C are aberration diagrams of Example 2.
Figure 4B:
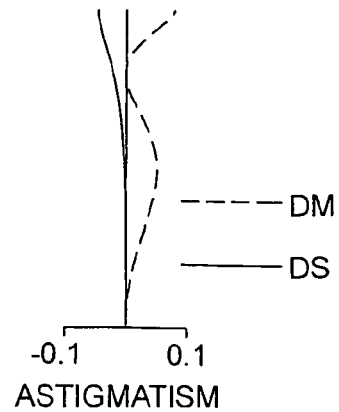
Figure 4C:
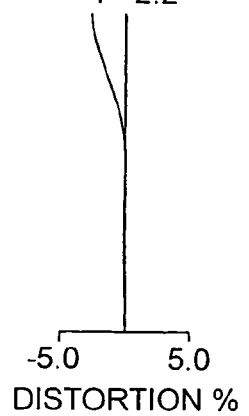

Hereinafter, taking lens systems embodying the present invention will be described with reference to the drawings. FIGS. 1 and 2 show the lens constructions of a first and a second embodiment of the present invention, as observed in an optical section thereof. In both embodiments, the taking lens system is a single-focal-length lens system designed for image taking (for example, for use in a digital camera), that is, for forming an optical image on a solid-state image sensor (for example, a CCD). The taking lens system is composed of, from the object side thereof, an aperture stop ST and the following three lens elements: a first lens element L1 having a positive optical power and convex to the object side; a second lens element L2 having a positive optical power and convex to the image surface side; and a third lens element L3 having a negative optical power and concave to the image surface side. Further to the image side is disposed a glass filter GF in the shape of a plane-parallel plate, and this corresponds to an optical low-pass filter and the like. In each lens construction diagram (FIGS. 1 and 2), a symbol in the form of ri (i=1, 2, 3, . . . ) represents the i-th surface as counted from the object side (an asterisk (*) following the symbol indicates an aspherical surface), and a symbol in the form of di (i=1, 2, 3, . . . ) represents the i-th axial distance as counted from the object side.

Now, the lens construction of each embodiment will be described in more detail. In both the first and second embodiments (FIG. 1 and 2), the first to third lens elements L1 to L3 are all meniscus lens elements. Specifically, the first lens element L1 is a positive lens element having a meniscus shape convex to the object side, the second lens element L2 is a positive lens element having a meniscus shape convex to the image surface side, and the third lens element L3 is a negative lens element having a meniscus shape concave to the image surface side. The lens surfaces of these three lens elements are all aspherical surfaces.

In both embodiments, the three-lens-element, namely positive-positive-negative, construction is so designed, by giving the lens elements appropriate optical powers (here, an optical power is the quantity defined as the reciprocal of a focal length) and otherwise, as to achieve compactness and low cost while achieving satisfactory optical performance required in a taking lens system for use with a solid-state image sensor. By employing the taking lens system of either embodiment as that of an image input device such as a digital camera or a camera-equipped cellular phone, it is possible to make the image input device high-performance, versatile, low-cost, and compact. The conditions that should preferably be fulfilled to obtain these benefits with a proper balance, and also to achieve further benefits such as still higher optical performance, will now be described.

First, the conditional formulae that should preferably be fulfilled by the taking lens system of each embodiment, that is, the conditional formulae that should preferably be fulfilled by a taking lens system of the type like that of the first or second embodiment, will be described. It should however be understood that not all the conditional formulae described below need to be fulfilled simultaneously. That is, individually fulfilling whichever of those conditional formulae is appropriate for a given optical construction provides the corresponding benefits and advantages. Needless to say, from the viewpoints of optical performance, compactness, manufacture, assembly, and other aspects, it is preferable that as many of the conditional formulae as possible be fulfilled. The conditional formulae are applicable to a taking lens system having, from the object side, an aperture stop and a three-lens-element, namely positive-positive-negative, construction, and preferably to a taking lens system composed of, from the object side, an aperture stop and the following three lens elements: a first lens element having a positive optical power and convex to the object side; a second lens element having a positive optical power and convex to the image surface side; and a third lens element having a negative optical power and concave to the image surface side. It is preferable that the first lens element be a positive lens element having a meniscus shape convex to the object side, that the second lens element be a positive lens element having a meniscus shape convex to the image surface side, and that the third lens element be a negative lens element having a meniscus shape concave to the image surface side.

It is preferable that conditional formula (1) below be fulfilled.

$$1.3 < f1/f2 < 3 \tag{1}$$

where f1 represents the focal length of the first lens element; and f2 represents the focal length of the second lens element.

Conditional formula (1) defines a conditional range that should preferably be fulfilled by the first and second lens elements chiefly to achieve a proper balance between the total length and the sensitivity to manufacturing errors. Disregarding the upper limit of conditional formula (1) is advantageous in terms of the sensitivity to manufacturing errors, but results in an unduly large total length. By contrast, disregarding the lower limit of conditional formula (1) is advantageous in terms of reducing the total length, but results in unduly high sensitivity to manufacturing errors, leading to unduly large aberrations.

It is further preferable that conditional formula (1a) below be fulfilled.

$$1.6 < f1/f2 < 2.5 \tag{1a}$$

This conditional formula (1a) defines, within the conditional range defined by conditional formula (1) above, a further preferable conditional range from the above-mentioned and other viewpoints.

It is preferable that conditional formula (2) below be fulfilled.

$$-4 < (r2+r3)/(r2-r3) < -2 \tag{2}$$

where r2 represents the radius of curvature of the object-side surface of the first lens element; and r3 represents the radius of curvature of the image-side surface of the first lens element.

Conditional formula (2) defines the conditional range that should preferably be fulfilled by the first lens element chiefly to achieve a proper balance between the exit pupil position and the distortion produced. Disregarding the lower limit of conditional formula (2) is advantageous in terms of the exit pupil position, but results in unduly large distortion. By contrast, disregarding the upper limit of conditional formula (2) is advantageous in terms of distortion, but is disadvantageous in terms of the exit pupil position. This makes the taking lens system unsuitable for use with a solid-state image sensor.

It is further preferable that conditional formula (2a) below be fulfilled.

$$-3.5 < (r2+r3)/(r2-r3) < -2.5 \tag{2a}$$

This conditional formula (2a) defines, within the conditional range defined by conditional formula (2) above, a further preferable conditional range from the above-mentioned and other viewpoints.

It is preferable that conditional formula (3) below be fulfilled.

$$-1.4 < f/f3 < -1 \qquad (3)$$

where f represents the focal length of the entire taking lens system; and f3 represents the focal length of the third lens element.

Conditional formula (3) defines a conditional range that should preferably be fulfilled by the third lens element chiefly to achieve a proper balance between the total length and the aberrations produced. Disregarding the upper limit of conditional formula (3) is advantageous in terms of aberration correction, but results in an unduly large total length. By contrast, disregarding the lower limit of conditional formula (3) is advantageous to reducing the total length, but results in unduly large aberrations, in particular distortion and curvature of field.

It is further preferable that conditional formula (3a) below be fulfilled.

$$-1.30 < f/f3 < -1.05 \qquad (3a)$$

This conditional formula (3a) defines, within the conditional range defined by conditional formula (3) above, a further preferable conditional range from the above-mentioned and other viewpoints.

It is preferable that conditional formula (4) below be fulfilled.

$$0.1 < d2/f < 0.3 \qquad (4)$$

where d2 represents the axial thickness of the first lens element; and f represents the focal length of the entire taking lens system.

Conditional formula (4) defines a conditional range that should preferably be fulfilled by the axial thickness of the first lens element. Disregarding the lower limit of conditional formula (4) is advantageous in reducing the total length, but results in unduly large aberrations, in particular distortion and curvature of field. By contrast, disregarding the upper limit of conditional formula (4) is advantageous in terms of obtaining higher optical performance, but results in making the optical total length unduly large.

It is further preferable that conditional formula (4a) below be fulfilled.

$$0.15 < d2/f < 0.20 \qquad (4a)$$

This conditional formula (4a) defines, within the conditional range defined by conditional formula (4) above, a further preferable conditional range from the above-mentioned and other viewpoints.

As is the case in both embodiments, it is preferable that all the lens elements each have an aspherical surface on at least one side thereof, and it is further preferable that all the lens surfaces be aspherical surfaces. Giving each of the first to third lens elements at least one aspherical surface greatly contributes to satisfactory correction of aspherical aberration, coma, and distortion. It is preferable that the third lens element have an aspherical surface on the image side thereof, and that this surface have increasingly weak negative optical powers from center to edge to eventually have a positive optical power in an edge portion. This contributes to locating the exit pupil position far away while keeping the optical total length compact.

In all the embodiments, the taking lens system is composed solely of refractive lens elements, which deflect incident light by refraction (i.e. lens elements of the type that deflects light at the interface between two media having different refractive indices). It is possible, however, to replace any of these lens elements with a lens element of any other type, for example, a diffractive lens element, which deflects incident light by diffraction, or a refractive/diffractive hybrid lens element, which deflects incident light by diffraction and refraction combined together, or a gradient index lens element, which deflects incident light with varying refractive indices distributed within a medium. Among these types, gradient index lens elements, which have varying refractive indices distributed within a medium, are expensive because of the complicated fabrication process they require. Therefore, in a taking lens system embodying the invention, it is preferable to use lens elements formed of a uniform material as all of the first to third lens elements.

As required, in addition to the aperture stop, a beam restricting plate or the like for cutting unnecessary light may be arranged. As required, a kind of prism (for example, a rectangular prism), a kind of mirror (for example, a flat mirror), or the like may be arranged in the optical path so as to bend, with a surface thereof having no optical power (for example, a reflective or diffractive surface) the optical path in front of, behind, or in the middle of the taking lens system to form a bending optical system (for example, one that reflects a light beam so that the optical axis is bent by exactly or approximately 90 degrees). Where to bend the optical path may be determined to suit particular needs. By bending the optical path appropriately, it is possible to make apparently slim and compact the digital apparatus (such as a digital camera) in which the taking lens system is incorporated.

The taking lens systems of the embodiments are both suitable as compact taking lens systems for use in digital cameras and digital apparatuses equipped with image input capabilities (for example, camera-equipped cellular phones), and, by combining one of those taking lens systems with an optical filter and an image sensor, it is possible to build a taking lens device that takes in an image of a subject optically and outputs it as an electrical signal. A taking lens device is used as the main component of a camera that is used to take a still or moving picture of a subject. A taking lens device is composed of, for example, from the object (subject) side, a taking lens system for forming an optical image of a subject, an optical filter such as an optical low-pass filter or an infrared cut filter, and an image sensor, such as CCD, that converts the optical image formed by the taking lens system into an electrical signal.

Examples of such cameras include: digital cameras; video cameras; surveillance cameras; vehicle-mounted cameras; cameras for videophones; cameras for intercoms; and cameras incorporated in or externally fitted to digital devices and the like, such as personal computers, mobile computers, cellular phones, portable data devices (or personal digital assistants, abbreviated to PDAs), and peripheral devices for them (such as mouses, scanners, and printers). As these examples tell, it is possible not only to build cameras by the use of taking lens devices, but also to add camera capabilities to various devices by incorporating taking lens devices in them. For example, it is possible to build a digital device equipped with an image input capability, such as a camera-equipped cellular phone. The camera capability can be realized in a desired form. For example, the taking lens device may be built as a unit so as to be detachably or rotatably attached to the body of a camera, or may be built as a unit so as to be detachably or rotatably attached to a portable data device (such as a cellular phone or PDA).

Used as the image sensor is, for example, a solid-state image sensor such as a CCD or CMOS (complementary metal oxide semiconductor) sensor having a plurality of pixels. The optical image formed by the taking lens system is converted into an electrical signal by the solid-state image sensor. The optical image to be formed by the taking lens system passes through the optical low-pass filter having a predetermined cutoff frequency characteristic that depends on the pixel pitch of the solid-state image sensor, and meanwhile the optical image has its spatial frequency characteristic so adjusted as to minimize so-called aliasing noise generated when the optical image is converted into an electric signal. The signal produced by the solid-state image sensor is subjected to predetermined digital image processing, image compression processing, and the like as required, and is recorded in a memory (such as a semiconductor memory or an optical disk) as a digital video signal; in some cases, the signal is transferred to another apparatus through a cable or after being converted into an infrared signal.

In the embodiments, a glass filter GF is used as the optical low-pass filter disposed between the last surface of the taking lens system and the solid-state image sensor; instead, it is possible to use any other type that suits the digital input device actually used. For example, it is possible to use a birefringence-type low-pass filter made of quartz or the like having an appropriately aligned crystal axis, a phase-type low-pass filter that achieves the required optical cut-off frequency characteristics by exploiting diffraction, or a low-pass filter of any other type.

As will be clear from the foregoing, the embodiments described above and the practical examples described later include the constructions described below. With these constructions, it is possible to realize low-cost, compact taking lens devices that offer satisfactory optical performance and, by incorporating them in camera, digital devices, and the like, it is possible to make these devices high-performance, versatile, low-cost, and compact.

(U1) A taking lens device including a taking lens system for forming an optical image and an image sensor for converting the optical image formed by the taking lens system into an electrical signal, the taking lens device being characterized in that the taking lens system includes, from the object side thereof, an aperture stop, a first lens element having a positive optical power and convex to the object side, a second lens element having a positive optical power and convex to an image-surface side, and a third lens element having a negative optical power and concave to the image-surface side, and that at least one of conditional formulae (1), (1a), (2), (2a), (3), (3a), (4), and (4a) is fulfilled.

(U2) A taking lens device including a taking lens system for forming an optical image and an image sensor for converting the optical image formed by the taking lens system into an electrical signal, the taking lens device being characterized in that the taking lens system includes, from the object side thereof, an aperture stop, a first lens element having a positive optical power, having a meniscus shape, and convex to the object side, a second lens element having a positive optical power; and a third lens element having a negative optical power, and that at least one of conditional formulae (1), (1a), (2), (2a), (3), (3a), (4), and (4a) is fulfilled.

(U3) A taking lens device as described in (U1) or (U2) above, wherein the first to third lens elements each have aspherical surfaces on both sides thereof.

(U4) A taking lens device as described in one of (U1), (U2), and (U3) above, wherein the third lens element has an aspherical surface on the image-surface side thereof, and this surface has increasingly weak negative optical powers from center to edge so as to eventually have a positive optical power in an edge portion thereof.

(U5) A taking lens device as described in one of (U1), (U2), (U3), and (U4) above, wherein the first to third lens elements are each formed of a uniform material.

(C1) A camera characterized in that the camera includes a taking lens device as described in one of (U1), (U2), (U3), (U4), and (U5) above, and that the camera is used to take at least either a still picture or a moving picture of a subject.

(C2) A camera as described in (C1) above, wherein the camera is a digital camera, a video camera, or a camera incorporated in or externally fitted to a personal computer, a mobile computer, a cellular phone, a portable data terminal, or a peripheral device therefor.

(D1) A digital device characterized in that the digital device includes a taking lens device as described in one of (U1), (U2), (U3), (U4), and (U5) above so as to be furnished with a capability of taking at least either a still picture or a moving picture of a subject.

(D2) A digital device described in (D1) above, wherein the digital device is a personal computer, a mobile computer, a cellular phone, a portable data terminal, or a peripheral device therefor.

EXAMPLES

Hereinafter, practical examples of taking lens systems embodying the present invention will be presented with reference to their construction data and other data. Tables 1 and 2 show the construction data of Examples 1 and 2, respectively. Examples 1 and 2 are numerical examples corresponding to the first and second embodiments, respectively, described hereinbefore. Thus, the lens construction diagrams (FIGS. 1 and 2) of the first and second embodiments also show the lens constructions of Examples 1 and 2, respectively.

In the construction data of each example, a symbol in the form of ri (i=1, 2, 3, ... ) represents the radius of curvature (mm) of the i-th surface as counted from the object side, a symbol in the form of di (i=1, 2, 3, ... ) represents the i-th axial distance (mm) as counted from the object side, and symbols in the form of Ni (i=1, 2, ... ) and vi (i=1, 2, ... ) represent the refractive index (Nd) for the d-line and the Abbe number (vd), respectively, of the i-th optical element as counted from the object side. Shown together with these data are the focal length (f, mm) and the f-number (FNO) of the taking lens system as a whole. Table 3 shows the values of the conditional formulae as actually observed in Examples 1 and 2.

A surface of which the radius of curvature ri is marked with an asterisk (*) is a refractive optical surface having an aspherical shape or a surface that exerts a refractive effect equivalent to that of an aspherical surface. The surface shape of such an aspherical surface is defined by formula (AS) below. The aspherical surface data of the aspherical surfaces used in each example are also shown together with the other data mentioned above (no coefficients that equal zero are shown).

$$X(H) = C_0 \cdot H^2 / (1 + \sqrt{1 - \epsilon \cdot C_0^2 \cdot H^2}) + \Sigma A_j \cdot H^j \qquad \text{(AS)}$$

where

H represents the height in the direction perpendicular to the optical axis AX;

X(H) represents the displacement along the optical axis (that is, the sag) AX at the height H;

$C_0$ represents the paraxial curvature (=1/ri);

$\epsilon$ represents a quadric surface parameter;

j represents the order of the aspherical surface; and

Aj represents the aspherical surface coefficient of order j.

FIGS. 3A to 3C and 4A to 4C are aberration diagrams of Examples 1 and 2, respectively. Of these aberration diagrams, those with their numbers suffixed with "A" show spherical aberration, those with their numbers suffixed with "B" show astigmatism, and those with their numbers suffixed with "C" show distortion, with FNO representing the f-number and Y' representing the maximum image height (mm). In the diagrams showing spherical aberration, the solid line d, dash-and-dot line g, and dash-dot-dot line c represent the spherical aberration (mm) observed for the d-, g-, and c-lines, respectively, and the broken line SC represents the deviation (mm) from the sine condition. In the diagrams showing astigmatism, the broken line DM and the solid line DS represent the astigmatism (mm) observed on the meridional and sagittal planes, respectively. In the diagrams showing distortion, the solid line represents the distortion (%) observed for the d-line.

TABLE 1

Example 1
f = 3.56, FNO = 4.0

| Radius of Curvature | Axial Distance | Refractive Index | Abbe Number |
|---|---|---|---|
| r1 = ∞ (ST) | d1 = 0.000 | | |
| r2* = 1.560 | d2 = 0.611 | N1 = 1.53048 | ν1 = 55.72(L1) |
| r3* = 3.205 | d3 = 0.703 | | |
| r4* = −2.378 | d4 = 0.966 | N2 = 1.53048 | ν2 = 55.72(L2) |
| r5* = −0.944 | d5 = 0.100 | | |
| r6* = 5.447 | d6 = 0.656 | N3 = 1.58340 | ν3 = 30.23(L3) |
| r7* = 1.200 | d7 = 0.500 | | |
| r8 = ∞ | d8 = 0.500 | N4 = 1.51680 | ν4 = 64.20(GF) |
| r9 = ∞ | | | |

[Aspherical Surface Data of Surface r2]

$\epsilon = -0.77750 \times 10, A4 = 0.30133, A6 = -0.18716$
[Aspherical Surface Data of Surface r3]

$\epsilon = -0.32536 \times 10, A4 = 0.12859, A6 = 0.96276 \times 10^{-1}$
[Aspherical Surface Data of Surface r4]

$\epsilon = -0.17634 \times 10^2, A4 = -0.16810, A6 = 0.37183 \times 10^{-1},$
$A8 = 0.13745, A10 = -0.27842 \times 10^{-1}$
[Aspherical Surface Data of Surface r5]

$\epsilon = 0.29577, A4 = 0.49555 \times 10^{-1}, A6 = -0.17811 \times 10^{-1},$
$A8 = -0.14756 \times 10^{-1}, A10 = 0.29727 \times 10^{-1}$
[Aspherical Surface Data of Surface r6]

$\epsilon = 0.17544 \times 10, A4 = -0.24387, A6 = 0.11001, A8 = -0.45300 \times 10^{-1},$
$A10 = 0.24779 \times 10^{-1}, A12 = -0.87870 \times 10^{-2}$
[Aspherical Surface Data of Surface r7]

$\epsilon = -0.40000 \times 10, A4 = -0.15919, A6 = 0.91191 \times 10^{-1},$
$A8 = -0.38452 \times 10^{-1}, A10 = 0.91696 \times 10^{-2},$
$A12 = -0.97609 \times 10^{-3}$

TABLE 2

Example 2
f = 3.51, FNO = 4.0

| Radius of Curvature | Axial Distance | Refractive Index | Abbe Number |
|---|---|---|---|
| r1 = ∞ (ST) | d1 = 0.000 | | |
| r2* = 1.462 | d2 = 0.612 | N1 = 1.53048 | ν1 = 55.72(L1) |
| r3* = 2.831 | d3 = 0.764 | | |
| r4* = −3.456 | d4 = 0.964 | N2 = 1.53048 | ν2 = 55.72(L2) |
| r5* = −1.159 | d5 = 0.100 | | |
| r6* = 3.554 | d6 = 0.656 | N3 = 1.58340 | ν3 = 30.23(L3) |
| r7* = 1.152 | d7 = 0.500 | | |
| r8 = ∞ | d8 = 0.500 | N4 = 1.51680 | ν4 = 64.20(GF) |
| r9 = ∞ | | | |

[Aspherical Surface Data of Surface r2]

$\epsilon = -0.52989 \times 10, A4 = 0.28235, A6 = -0.14635$
[Aspherical Surface Data of Surface r3]

$\epsilon = -0.35960 \times 10, A4 = 0.13545, A6 = 0.68161 \times 10^{-1}$
[Aspherical Surface Data of Surface r4]

$\epsilon = -0.68322 \times 10, A4 = -0.38560 \times 10^{-1}, A6 = -0.22741 \times 10^{-1},$
$A8 = 0.94379 \times 10^{-2}, A10 = 0.36530 \times 10^{-1}$
[Aspherical Surface Data of Surface r5]

$\epsilon = 0.45134, A4 = -0.16882 \times 10^{-1}, A6 = -0.44234 \times 10^{-2},$
$A8 = 0.17818 \times 10^{-1}, A10 = 0.55365 \times 10^{-2}$
[Aspherical Surface Data of Surface r6]

$\epsilon = 0.20629 \times 10, A4 = -0.33010, A6 = 0.13147, A8 = -0.49477 \times 10^{-1},$
$A10 = 0.31953 \times 10^{-1}, A12 = -0.10098 \times 10^{-1}$
[Aspherical Surface Data of Surface r7]

$\epsilon = -0.40000 \times 10, A4 = -0.15498, A6 = 0.82349 \times 10^{-1},$
$A8 = -0.35200 \times 10^{-1}, A10 = 0.88419 \times 10^{-2}, A12 = -0.95148 \times 10^{-3}$

TABLE 3

| Conditional Formula | (1), (1a) f1/f2 | (2), (2a) (r2 + r3)/(r2 − r3) | (3), (3a) f/f3 | (4), (4a) d2/f |
|---|---|---|---|---|
| Example 1 | 2.12 | −2.90 | −1.27 | 0.17 |
| Example 2 | 1.72 | −3.14 | −1.08 | 0.17 |

What is claimed is:

1. A taking lens system for forming an image on a solid-state image sensor, the taking lens system comprising, from an object side thereof:

an aperture stop;

a first lens element having a positive optical power and convex to the object side;

a second lens element having a positive optical power and convex to an image-surface side; and a third lens element having a negative optical power and concave to the image-surface side, wherein the following conditional formulae (1) and (2) are fulfilled:

$$1.3 < f1/f2 < 3 \qquad (1)$$

$$-4 < (r2+r3)/(r2-r3) < -2 \qquad (2)$$

where f1 represents a focal length of the first lens element;

f2 represents a focal length of the second lens element;

r2 represents a radius of curvature of an object-side surface of the first lens element; and r3 represents a radius of curvature of an image-side surface of the first lens element.

2. The taking lens system of claim 1,
wherein the following conditional formula (3) is fulfilled:

$$-1.4 < f/f3 < -1 \quad (3)$$

where
- f represents a focal length of the entire taking lens system; and
- f3 represents a focal length of the third lens element.

3. The taking lens system of claim 1,
wherein the following conditional formula (4) is fulfilled:

$$0.1 < d2/f < 0.3 \quad (4)$$

where
- d2 represents an axial thickness of the first lens element; and
- f represents a focal length of the entire taking lens system.

4. The taking lens system of claim 2,
wherein the following conditional formula (4) is fulfilled:

$$0.1 < d2/f < 0.3 \quad (4)$$

where
- d2 represents an axial thickness of the first lens element; and
- f represents a focal length of the entire taking lens system.

5. A taking lens system for forming an image on a solid-state image sensor, the taking lens system comprising, from an object side thereof:
- an aperture stop;
- a first lens element having a positive optical power, having a meniscus shape, and convex to the object side;
- a second lens element having a positive optical power; and
- a third lens element having a negative optical power, wherein the following conditional formulae (1) and (2) are fulfilled:

$$1.3 < f1/f2 < 3 \quad (1)$$

$$-4 < (r2+r3)/(r2-r3) < -2 \quad (2)$$

where
- f1 represents a focal length of the first lens element;
- f2 represents a focal length of the second lens element;
- r2 represents a radius of curvature of an object-side surface of the first lens element; and
- r3 represents a radius of curvature of an image-side surface of the first lens element.

6. The taking lens system of claim 5,
wherein the following conditional formula (3) is fulfilled:

$$-1.4 < f/f3 < -1 \quad (3)$$

where
- f represents a focal length of the entire taking lens system; and
- f3 represents a focal length of the third lens element.

7. The taking lens system of claim 5,
wherein the following conditional formula (4) is fulfilled:

$$0.1 < d2/f < 0.3 \quad (4)$$

where
- d2 represents an axial thickness of the first lens element; and
- f represents a focal length of the entire taking lens system.

8. The taking lens system of claim 6,
wherein the following conditional formula (4) is fulfilled:

$$0.1 < d2/f < 0.3 \quad (4)$$

where
- d2 represents an axial thickness of the first lens element; and
- f represents a focal length of the entire taking lens system.

* * * * *